US012253921B2

(12) United States Patent
Ren et al.

(10) Patent No.: US 12,253,921 B2
(45) Date of Patent: Mar. 18, 2025

(54) CPU-GPU LOCKSTEP SYSTEM

(71) Applicant: Huawei Technologies Co., Ltd., Shenzhen (CN)

(72) Inventors: Da Qi Ren, Saratoga, CA (US); Liang Peng, Los Gatos, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/300,642

(22) Filed: Apr. 14, 2023

(65) Prior Publication Data
US 2023/0251941 A1   Aug. 10, 2023

Related U.S. Application Data

(63) Continuation of application No. PCT/US2020/055955, filed on Oct. 16, 2020.

(51) Int. Cl.
*G06F 11/20* (2006.01)
*G06F 11/18* (2006.01)

(52) U.S. Cl.
CPC ........ *G06F 11/184* (2013.01); *G06F 11/2033* (2013.01)

(58) Field of Classification Search
CPC ...... G06F 11/183; G06F 11/184; G06F 11/18; G06F 11/202; G06F 11/2038; G06F 11/2025; G06F 11/2028
See application file for complete search history.

(56) References Cited

U.S. PATENT DOCUMENTS

| 5,903,717 A | 5/1999 | Wardrop |
| 2007/0260939 A1 | 11/2007 | Kammann et al. |
| 2013/0024721 A1 | 1/2013 | Kabulepa et al. |
| 2013/0141443 A1* | 6/2013 | Schmit ...................... G06F 8/41 345/505 |

(Continued)

OTHER PUBLICATIONS

Ren, Da-Qi, et al., "A Failure Recovery Solution for Transplanting High-Performance Data-Intensive Algorithms from the Cluster to the Cloud," IEEE International Conference on High Performance Computing and Communication & IEEE International Conference on Embedded and Ubiquitous Computing, Nov. 2013, 6 pages.

(Continued)

*Primary Examiner* — Yolanda L Wilson
(74) *Attorney, Agent, or Firm* — Pearl Cohen Zedek Latzer Baratz LLP

(57) ABSTRACT

A lockstep controller operates a lockstep system of three or more CPU-GPU pairs, comparing the outputs from the CPU-GPU pairs and, by way of a majority vote, provides the output for the lockstep system. Based on comparing the outputs, if one of the CPU-GPU pairs provides outputs that disagree with the majority outputs, it can be switched out of the lockstep system. The removed CPU is replaced by a backup CPU. So that the backup CPU can be part of a CPU-GPU pair, a portion of the address space from the GPU of one of the other CPU-GPU pairs is assigned to the backup CPU to operate as a replacement CPU-GPU pair, while the CPU already associated with this GPU retains another portion of the GPU's address space to continue operating as a CPU-GPU pair.

20 Claims, 13 Drawing Sheets

(56) References Cited

U.S. PATENT DOCUMENTS

| | | | | |
|---|---|---|---|---|
| 2013/0160016 | A1* | 6/2013 | Gummaraju | G06F 9/5044 |
| | | | | 718/102 |
| 2015/0287157 | A1* | 10/2015 | Zante | G06F 13/4068 |
| | | | | 345/505 |
| 2017/0220384 | A1* | 8/2017 | Anderson | G06F 9/4893 |
| 2017/0313325 | A1* | 11/2017 | Asakura | B60W 50/12 |
| 2019/0391888 | A1* | 12/2019 | Meriac | G06F 11/1497 |
| 2021/0157487 | A1* | 5/2021 | Guyer | G06F 3/0611 |
| 2022/0100601 | A1* | 3/2022 | Baum | G06F 11/1608 |

OTHER PUBLICATIONS

International Search Report & The Written Opinion of the International Searching Authority dated Jul. 6, 2021, International Application No. PCT/US2020/055955.

Schor, David, "A look at Nvidia's NVLink interconnect and the NVSwitch—WikiChip Fuse," [https://fuse.wikichip.org/news/1224/a-look-at-nvidias-nvlink-interconnect-and-the-nvswitch/], May 2018, 12 pages.

Shahab, Fatemi, et al., "AMITIS: A 3D GPU-Based Hybrid-PIC Model for Space and Plasma Physics," Journal of Physics, Conference Series, Inst. of Physics Publishing, vol. 837, No. 1, May 2017, 27 pages.

Xinxin, Mei, et al., "Energy efficient real-time task scheduling on CPU-GPU hybrid clusters," IEEE Conference on Computer Communications, May 2017.

* cited by examiner

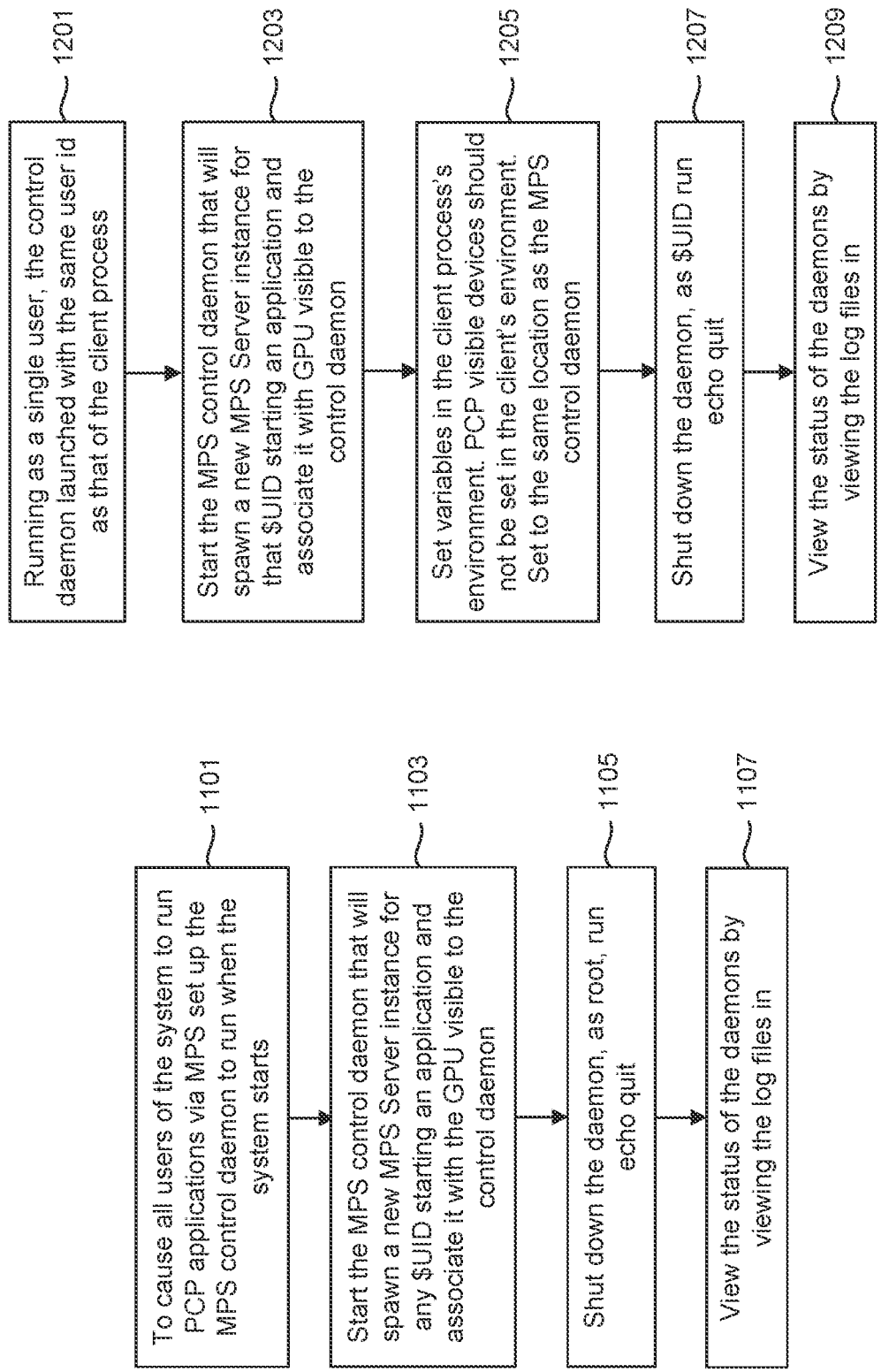

CPU-GPU LOCKSTEP SYSTEM

PRIORITY CLAIM

This application is a continuation of PCT Patent Application No. PCT/US2020/055955, entitled, "CPU-GPU Lockstep System," filed Oct. 16, 2020, by Ren et al., which is incorporated by reference herein in its entirety.

FIELD

The following is related generally to the field of microprocessors and, more specifically, to lock-step computing systems.

BACKGROUND

Computer systems used in applications that need to avoid errors, such as a vehicle control platform model in which a computer failure could be catastrophic, frequently use a lockstep arrangement. A lockstep system is a fault-tolerant system that runs multiple copies the same set of operations at the same time in parallel. This redundancy allows for error detection and correction as the output from the parallel operations can be compared to determine whether there has been a fault. A problem with such lockstep systems is that when multiple processors are being run in parallel, if that one of the processors fail, the redundancy fails and error correction and redundancy is lost.

SUMMARY

According to one aspect of the present disclosure, a processing system includes three or more central processing unit (CPU)-graphical processing unit (GPU) pairs, a backup CPU and a lockstep controller connected to the three or more CPU-GPU pairs and to the backup CPU. The CPU of each CPU-GPU pair is configured to run kernels for programs executing on a corresponding GPU of the CPU-GPU pair. The lockstep controller is configured to: operate the three or more CPU-GPU pairs in parallel to execute programs in a lockstep manner, the CPU of each CPU-GPU pairs running kernels for the programs in parallel; compare an output from each CPU of the three or more CPU-GPU pairs for each of one or more kernels running on the CPUs of the three or more CPU-GPU pairs; and based upon comparing the outputs, determine whether any of the CPU-GPU pairs are defective. In response to determining that a first of the CPU-GPU pairs is defective, the lockstep controller is configured to: discontinue the operation of the first GPU-CPU pair in parallel to execute programs in a lockstep manner with others of the three or more CPU-GPU pairs; and operate the others of the three or more CPU-GPU pairs and the backup CPU and the GPU of a second of the CPU-GPU pairs in parallel to execute programs in a lockstep manner, the CPU of the second CPU-GPU pair operating as a CPU-GPU pair with the GPU of the second CPU-GPU pair and the backup CPU operating as a CPU-GPU pair with the GPU of the second CPU-GPU pair, the backup CPU and the CPUs of the others of the CPU-GPU pairs running kernels for the programs in parallel.

Optionally, in the preceding aspect, the lockstep controller is further configured to: assign a first portion of an address space of the GPU of the second CPU-GPU pair to execute the programs for which the second CPU runs kernels; and assign a second portion of the address space of the GPU of the second of the CPU-GPU pairs to execute the programs for which the backup CPU runs kernels, the second CPU operating as a CPU-GPU pair with the first portion of the address space of the GPU of the second CPU-GPU pair and the backup CPU operating as a CPU-GPU pair with the second portion of the address space of the GPU of the second CPU-GPU pair.

Optionally, in any of the preceding aspects, the number of three or more CPU-GPU pairs is three.

Optionally, in any of the preceding aspects, the CPUs of the three or more CPU-GPU pairs and the backup CPU are configured to provide outputs to the lockstep controller by a message-passing interface.

Optionally, in the preceding aspect, the CPUs of the three or more CPU-GPU pairs and the backup CPU are configured as worker nodes for the message-passing interface, and the system further comprises an additional CPU-GPU pair, the CPU of the additional CPU-GPU pair configured as a master node for the message-passing interface.

Optionally, in any of the preceding aspects, the lockstep controller is further configured to, based upon comparing the outputs of kernels running on the CPUs, determine an output for the kernels running based on a majority vote determination.

Optionally, in any of the preceding aspects, in determining that a first of the CPU-GPU pairs is defective, the lockstep controller is further configured to determine when the output of the first CPU-GPU pair for one or more kernel differs from the outputs of the others of the CPU-GPU pairs for the kernels.

Optionally, in the preceding aspect, in determining that a first of the CPU-GPU pairs is defective, the lockstep controller is further configured to: maintain a count of a number of times that the output of the first CPU-GPU pair for one or more kernel differs from the outputs of the others of the CPU-GPU pairs for the kernels; and determine whether the count exceeds a threshold, wherein the first CPU-GPU pair is determined to be defective.

Optionally, in any of the preceding aspects, the programs include neural networks.

Optionally, in any of the preceding aspects, the programs include vehicle control programs.

According to an additional aspect of the present disclosure, there is provided a method of operating a processing system, which includes: operating three or more central processing unit (CPU)-graphical processing unit (GPU) pairs of the processing system in parallel to execute programs in a lockstep manner, the CPU of each CPU-GPU pairs running kernels for the programs in parallel; comparing an output from each CPU of the three or more CPU-GPU pairs for each of one or more kernels running on the CPUs of the three or more CPU-GPU pairs; and based upon comparing the outputs, determining whether any of the CPU-GPU pairs are defective. In response to determining that a first of the CPU-GPU pairs is defective, the method also includes: discontinuing operation of the first GPU-CPU pair in parallel to execute programs in a lockstep manner with others of the three or more CPU-GPU pairs; assigning a first portion of an address space of the GPU of a second of the CPU-GPU pairs to execute the programs for which the second CPU runs kernels; assigning a second portion of the address space of the GPU of a second of the CPU-GPU pairs to execute the programs for which a backup CPU of the processing system runs kernels; and operating the others of the three or more CPU-GPU pairs and the backup CPU and the GPU of a second of the CPU-GPU pairs in parallel to execute programs in a lockstep manner, the CPU of the second CPU-GPU pair operating as a CPU-GPU pair with the GPU of the second CPU-GPU pair and the backup CPU operating as a CPU-GPU pair with the second GPU of the second CPU-GPU pair, the backup CPU and the CPUs of the others of the CPU-GPU pairs running kernels for the programs in parallel.

Optionally, in the preceding aspect of a method, in response to determining that a first of the CPU-GPU pairs is defective, the method also includes: assigning a first portion of an address space of the GPU of the second CPU-GPU pair to execute the programs for which the second CPU runs kernels; assigning a second portion of the address space of the GPU of the second CPU-GPU pair to execute the programs for which a backup CPU of the processing system runs kernels; and operating the others of the three or more CPU-GPU pairs and the backup CPU and second GPU in parallel to execute programs in a lockstep manner by operating the second CPU as a CPU-GPU pair with the first portion of the address space of the GPU of the second CPU-GPU pair, and operating the backup CPU as a CPU-GPU pair with the second portion of the address space of the GPU of the second CPU-GPU pair.

Optionally, in either of the preceding aspects of a method, the method also includes determining a system output for the kernels by a majority vote determination based upon comparing the outputs of kernels running on the CPUs.

Optionally, in any of the preceding aspect of a method, the comparing is performed by a lockstep controller and the CPUs of the three or more CPU-GPU pairs and the backup CPU are configured to provide outputs to the lockstep controller by a message-passing interface.

Optionally, in the preceding aspect of a method, the CPUs of the three or more CPU-GPU pairs and the backup CPU are configured as worker nodes for the message-passing interface, and the method further comprises operating a CPU of an additional CPU-GPU pair as a master node for the message-passing interface.

Optionally, in any of the preceding aspects of a method, the processing system is configured to determine whether any of the CPU-GPU pairs are defective by determining when the output of the first CPU-GPU pair for one or more kernel differs from the outputs of the others of the CPU-GPU pairs for the kernels.

Optionally, in the preceding aspect of a method, determining that a first of the CPU-GPU pairs is defective includes: maintaining a count of a number of times that the output of the first CPU-GPU pair for one or more kernel differs from the outputs of the others of the CPU-GPU pairs for the kernels; and determining whether the count exceeds a threshold, wherein the first CPU-GPU pair is determined to be defective.

Optionally, in any of the preceding aspects of a method, the number of three or more CPU-GPU pairs is three.

Optionally, in any of the preceding aspects of a method, the programs include neural networks.

Optionally, in any of the preceding aspects of a method, the programs include vehicle control programs.

According to other aspects, a lockstep processing system includes a lockstep controller configured to be connected to three or more central processing unit (CPU)-graphical processing unit (GPU) pairs, the CPU of each CPU-GPU pair configured to run kernels for programs executing on a corresponding GPU of the CPU-GPU pair, and to a backup CPU. The lockstep controller is configured to: operate the three or more CPU-GPU pairs in parallel to execute programs in a lockstep manner, the CPU of each CPU-GPU pairs running kernels for the programs in parallel; compare an output from each CPU of the three or more CPU-GPU pairs for each of one or more kernels running on the CPUs of the three or more CPU-GPU pairs; based upon comparing the outputs, determine whether any of the CPU-GPU pairs are defective. In response to determining that a first of the CPU-GPU pairs is defective, the lockstep controller is configured to: discontinue the operation of the first GPU-CPU pair in parallel to execute programs in a lockstep manner with others of the three or more CPU-GPU pairs; and operate the others of the three or more CPU-GPU pairs and the backup CPU and the GPU of a second of the CPU-GPU pairs in parallel to execute programs in a lockstep manner, the CPU of the second CPU-GPU pair operating as a CPU-GPU pair with the GPU of the second CPU-GPU pair and the backup CPU operating as a CPU-GPU pair with the GPU of the second CPU-GPU pair, the backup CPU and the CPUs of the others of the CPU-GPU pairs running kernels for the programs in parallel.

In the preceding aspect for the lockstep processing system, the lockstep controller is further configured to: assign a first portion of an address space of the GPU of the second CPU-GPU pair to execute the programs for which the second CPU runs kernels; and assign a second portion of the address space of the GPU of the second of the CPU-GPU pairs to execute the programs for which the backup CPU runs kernels, the second CPU operating as a CPU-GPU pair with the first portion of the address space of the GPU of the second CPU-GPU pair and the backup CPU operating as a CPU-GPU pair with the second portion of the address space of the GPU of the second CPU-GPU pair.

In the preceding aspect for the lockstep processing system, the lockstep controller is further configured to, based upon comparing the outputs of kernels running on the CPUs, determine an output for the kernels running based on a majority vote determination.

In either of the preceding aspect for the lockstep processing system, in determining that a first of the CPU-GPU pairs is defective, the lockstep controller is further configured to determine when the output of the first CPU-GPU pair for one or more kernel differs from the outputs of the others of the CPU-GPU pairs for the kernels.

In the preceding aspect for the lockstep processing system, in determining that a first of the CPU-GPU pairs is defective, the lockstep controller is further configured to: maintain a count of a number of times that the output of the first CPU-GPU pair for one or more kernel differs from the outputs of the others of the CPU-GPU pairs for the kernels; and determine whether the count exceeds a threshold, wherein the first CPU-GPU pair is determined to be defective.

In any of the preceding aspect for the lockstep processing system, the programs include vehicle control programs.

BRIEF DESCRIPTION OF THE DRAWINGS

Aspects of the present disclosure are illustrated by way of example and are not limited by the accompanying figures for which like references indicate elements.

FIGS. 11 and 12 are embodiments for flows for the user's control in a multi-user system and a single-user system, respectively.

DETAILED DESCRIPTION

The following presents an efficient error detection method for a CPU-GPU lock-step mechanism that can identify GPU and CPU problems, allowing the lock-step mechanism to allocate resources in the event of a CPU/GPU problem quickly, efficiently, and accurately. More specifically, in a lockstep processing system, three or more CPU-GPU pairs are operated in parallel with the CPU running kernels for programs executing on the corresponding GPU of the pair. A lockstep controller operates the CPU-GPU pairs in a lockstep manner, comparing the outputs from the CPU-GPU pairs and, by way of a majority vote, provides the output for the lockstep system. Based on comparing the outputs, if one of the CPU-GPU pairs provides outputs that disagree with the majority outputs, it can be switched out of the lockstep system. The removed CPU is replaced by a backup CPU. So that the backup CPU can be part of a CPU-GPU pair, a portion of the address space from the GPU of one of the other CPU-GPU pairs is assigned to the backup CPU to operate as a replacement CPU-GPU pair, while the CPU already associated with this GPU retains another portion of the GPU's address space to continue operating as a CPU-GPU pair.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1A:
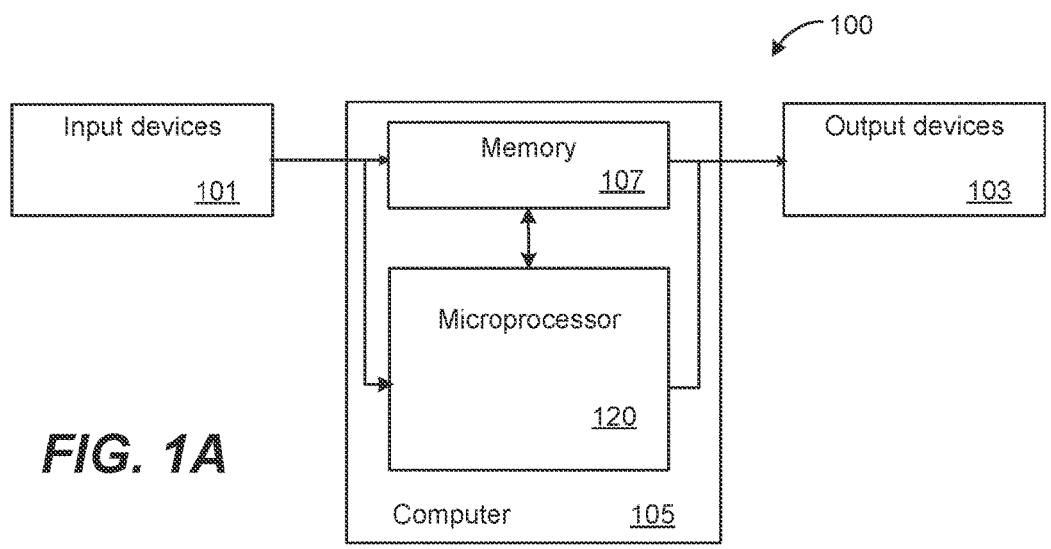
FIGS. 1A and 1B are respectively block diagrams of a computer system and a microprocessor that can be incorporated into such a computer system.
Figure 1B:
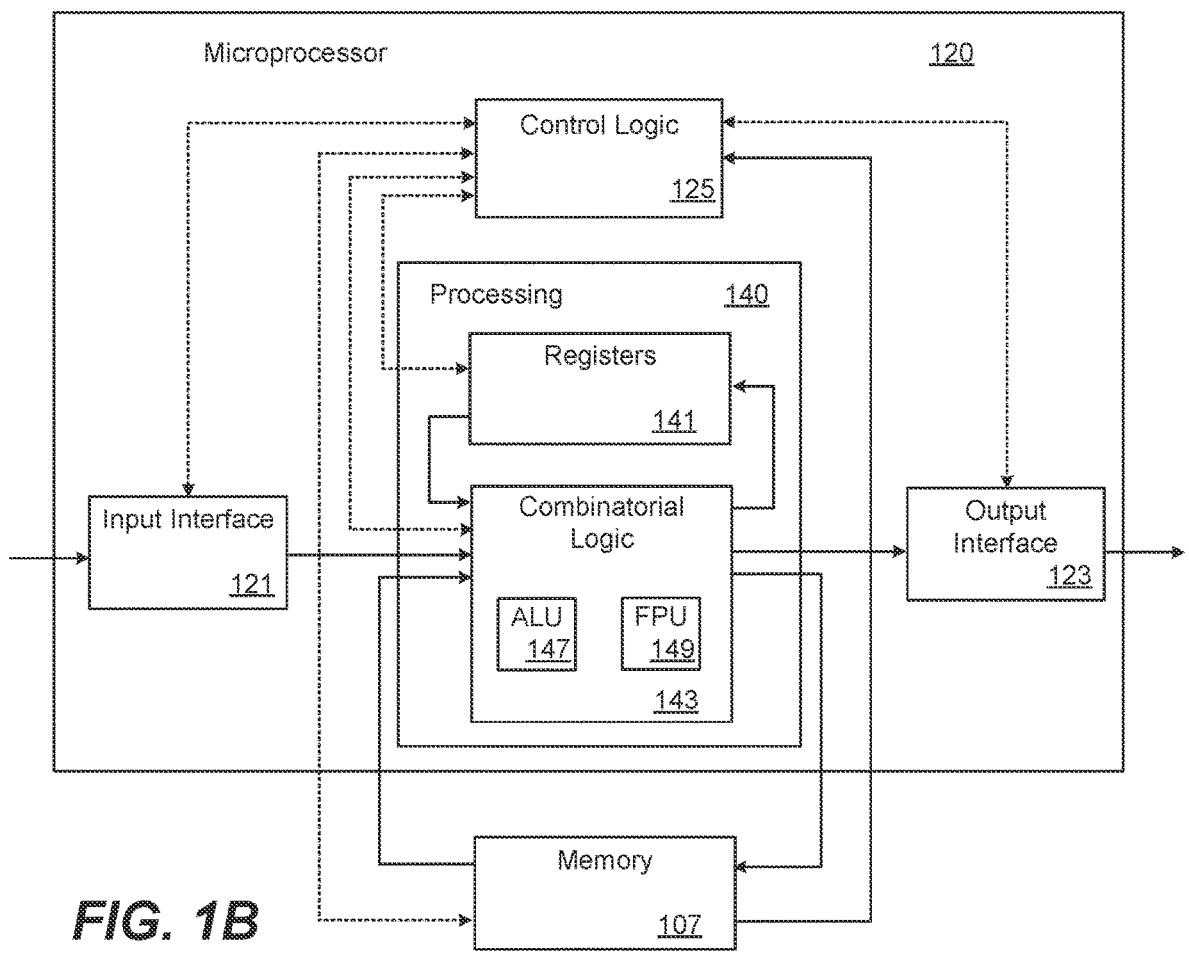

FIGS. 1A and 1B are respectively block diagrams of a computer system and a microprocessor such as can be incorporated into such a computer system. In the simplified representation of FIG. 1A, the computer system 100 includes a computer 105, one or more input devices 101 and one or more output devices 103. Common examples of input devices 101 include a keyboard or mouse. Common examples of output devices 103 include monitors or printers. The computer 105 includes memory 107 and microprocessor 120, where in this simplified representation the memory 107 is represented as a single block. The memory 107 can include ROM memory, RAM memory and non-volatile memory and, depending on the embodiment, include separate memory for data and instructions.

FIG. 1B illustrates one embodiment for the microprocessor 120 of FIG. 1A and also includes the memory 107. In the representation of FIG. 1B, the microprocessor 120 includes control logic 125, a processing section 140, an input interface 121, and an output interface 123. The dashed lines represent control signals exchanged between the control logic 125 and the other elements of the microprocessor 120 and the memory 107. The solid lines represent the flow of data and instructions within the microprocessor 120 and between the microprocessor 120 and memory 107.

The processing block 140 includes combinatorial logic 143 that is configured to execute instructions and registers 141 in which the combinatorial logic stores instructions and data while executing these instructions. In the simplified representation of FIG. 1B, specific elements or units, such as an arithmetic logic unit (ALU) 147, floating-point unit (FPU) processor 147, and other specific elements commonly used in executing instructions are not explicitly shown in the combinatorial logic 143 block. The combinatorial logic 143 is connected to the memory 107 to receive and execute instruction and supply back the results. The combinatorial logic 143 is also connected to the input interface 121 to receive input from input devices 101 or other sources and to the output interface 123 to provide output to output devices 103 or other destinations.

Figure 2:
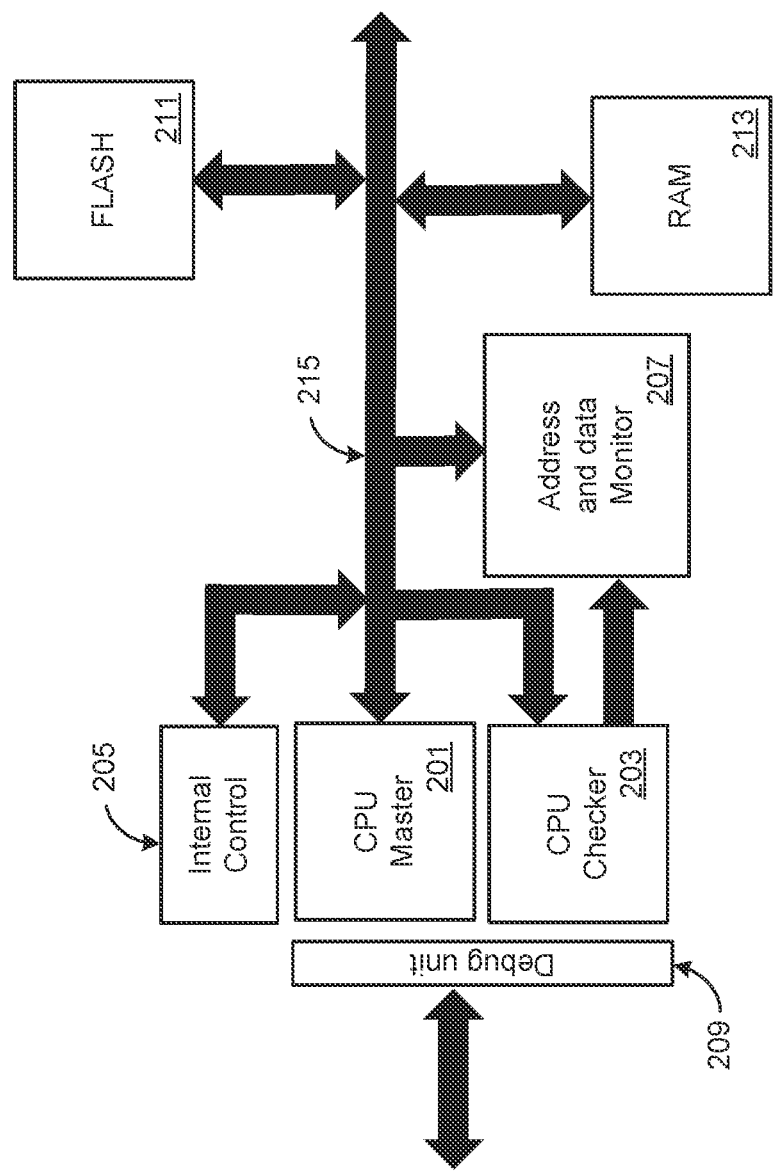
FIG. 2 is a block diagram of a lockstep dual processor architecture.

FIG. 2 is a block diagram of a lockstep dual processor architecture. In this embodiment, the architecture includes a first, or master, CPU 201 connected along a bus structure 215 to flash memory 211 and RAM 213, where these components can largely operate in a typical manner. A debug unit 209 is included to test and debug programs running on the CPU master 201 and allow a programmer to track its operations and monitor changes in resources, such as target programs and the operating system.

FIG. 2 also includes a second, or checker, CPU 203. The CPU checker 203 will run the same programs in parallel with the CPU master 201 in a lockstep manner as controlled by the internal control block 205. The CPU checker 203 is also connected the debug unit 209 and along bus structure 215 to flash memory 211 and RAM 213. The CPU checker 203 will duplicate the operation of the CPU master 201, with the addresses and data from the two CPUs monitored at block 207 and internal control 205 checking on whether the results from CPU checker 203 confirm the results of CPU master 201. This redundancy can provide error detection and correction, as the output from the parallel operations can be compared to determine whether there has been a fault. This arrangement can provide confidence in the results when the output of the CPU checker 203 matches that of the CPU master 201, but when they disagree, the result is ambiguous.

Figure 3:
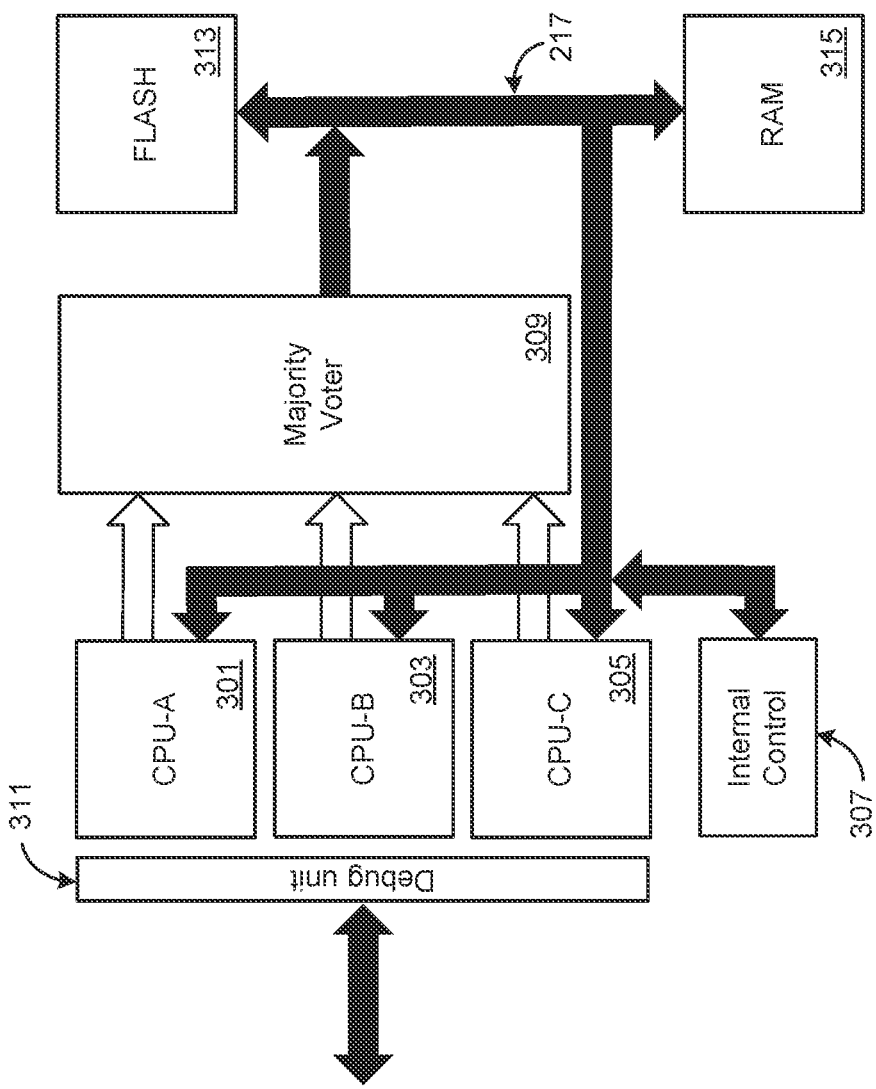
FIG. 3 illustrates triple modular redundant architecture, in which three CPUs are run in parallel in a lockstep manner and the resultant outputs are compared.

FIG. 3 illustrates a triple modular redundant architecture, in which three CPUs are run in parallel in a lockstep manner and the resultant outputs are compared. Each of CPU-A 201, CPU-B 203, and CPU-C 205 are connected to the debug unit 211 and over the bus structure 217 to RAM 215 and to the flash memory 213 or other storage memory for the system. CPU-A 201, CPU-B 203, and CPU-C 205 are operated in parallel, running the same programs in a lockstep manner under control of the internal control 207. Each of CPU-A 201, CPU-B 203, and CPU-C 205 can be operated on more or less the same footing and are treated with equal priority. The outputs of the three CPUs go to a majority voter block 209, where the logic circuitry within majority voter 209 compares the outputs. In this way, if the output from one of the CPUs disagrees with the other two, the majority result is provided as the system output from the majority voter 209.

The triple redundancy of the lockstep system of FIG. 3 can provide confidence in the system output, as an error in the execution of a program is unlikely to occur at the same time in multiple CPUs. (Errors in a program are dealt with by the debug unit.) However, if one of the CPUs repeatedly disagrees with the other two, this may indicate that the disagreeing CPU is defective. If one the CPUs, say CPU-C 205 for example, is defective, this can undermine the efficacy of the lockstep arrange since, if other two CPUs (CPU-A 201, CPU-B 203 in this example) disagree, the majority voter 209 can have three different inputs, so that no system output can be determined; or, worse, if CPU-A 201 and CPU-B 203 disagree, but one of them agrees with the defective CPU-C 205, then the majority voter 209 will output an incorrect system result as a correct, majority determined result.

A number of variations on the lockstep arrangements as shown in FIGS. 2 and 3 are possible. For example, a loosely-synchronized variation on the embodiment of FIG. 2 can be used, where each of two CPUs each have their own RAM and flash (or other storage memory), their own debug unit, and separate internal controllers, with an inter-channel communication link used to compare and synchronize the operation and results of the two processors. Alternately, the entire structure of FIG. 2 could be duplicated, with the multiple copies comparing and synchronizing operations and results over an inter-channel link.

The level at which the lockstep is implemented can also vary, with the degree of replication having different levels. For example, the replication can be at a system level, with each CPU having its own cache and main memory, with the input replicated and provided to each of the systems and the outputs also compared at this level. With replication at the sub-system level, each CPU could have its own cache, but have a common main memory, so that input is replicated and checked at the cache level. In the case of CPU level replication, the CPUs can share main memory and cache, with the input from the cache replicated for the for the multiple CPUs and the outputs checked at the CPU level.

The following considers CPU-GPU lockstep systems for applications, such as for vehicle safety, where the reliability of the system is critical. Systems such as modern vehicle control platform models are designed to process large data sets using parallel distributed algorithms on a set of connected distributed chipsets (e.g., heterogeneous platforms). One approach is a multi-core central processing unit (CPU)-graphical processing unit (GPU), with the non-working save lockstep detection/restart model used for fault tolerance. However, such lockstep detection is usually only for the CPU design. For a CPU-GPU architecture, once an error occurs on the GPU side, it is difficult to detect and correct the error. The following presents an efficient CPU-GPU detection method that can detect GPU errors without adding hardware, enabling the system to quickly confirm the fault and allow the lock-step mechanism to allocate CPU/GPU resources to the problem in a fast, efficient and accurate manner.

As discussed in more detail below, among the features of embodiments of the CPU-GPU lockstep systems are use of a Message-Passing Interface, or MPI, that supports both point-to-point and collective communication between the CPU-GPU nodes of the lockstep system, as this provides performance, scalability, and portability. A Multi-Process Service (MPS) implementation of a parallel computing platform (e.g., CUDA) application programming interface runtime architecture allows transparent co-operation of multi-processing parallel computing platform applications. Embodiments used for the MPS allow for clients (i.e., the CPU of a CPU-GPU pair) to submit work directly to the CPU without passing through an MPS server, with each client owning is own GPU address space, instead of sharing GPU address space with other clients paired with the GPU. Although presented in the context of a GPU-CPU, the techniques can more generally be applied to variations using other pairs of processors of different types arranged in the described hierarchical manner; for example, a tensor processing unit could be used in place of the GPU.

Figure 4:
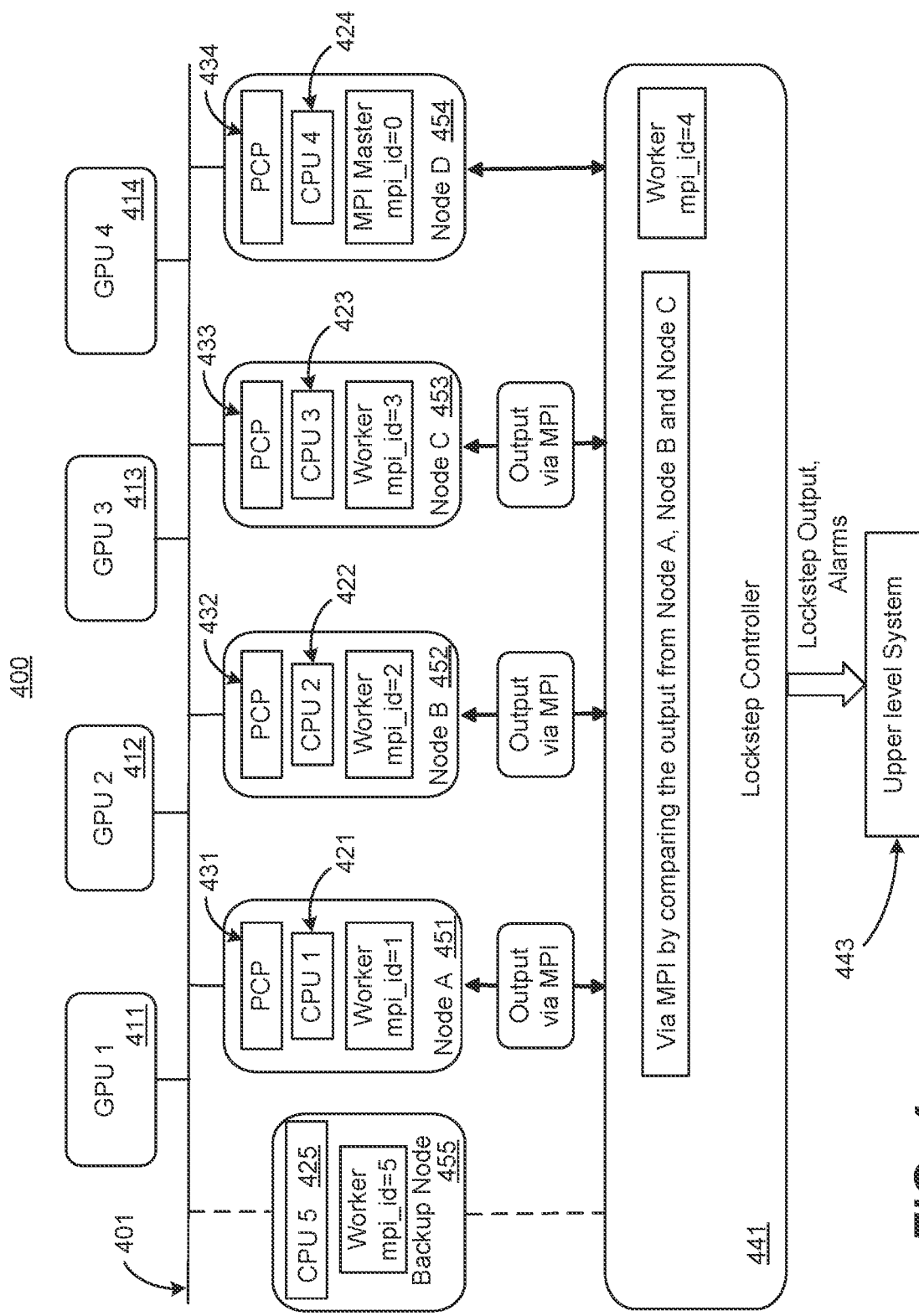
FIG. 4 illustrates the components for one embodiment a CPU-GPU lockstep system with improved redundancy capabilities.

FIG. 4 illustrates the components for one embodiment a CPU-GPU lockstep system 400 with improved redundancy capabilities. The system includes four GPUs, GPU 1 411, GPU 2 412, GPU 3 413, and GPU 4 414, connected to a bus structure 401 that is turn connected to a number of CPUs, CPU 1 421, CPU 2 422, CPU 3 423, CPU 4 424, and CPU 5 425. Initially, as represented in FIG. 4, the backup CPU, CPU 425 is initially not actively connected to the bus structure 401 and there are four CPU-GPU pairs: CPU 1 421 and GPU 1 411; CPU 2 422 and GPU 2 412; CPU 3 423 and GPU 3 413; and CPU 4 424 and GPU 4 414. In this initial configuration for system 400, the three CPU-GPU pairs (CPU 1 421/GPU 1 411), (CPU 2 422/GPU 2 412), and (CPU 3 423/GPU 3 413) are operated in parallel in a lockstep manner, with CPU-GPU pair (CPU 4 424/GPU 4 414) acting as a master that communicates with the other CPU-GPU pairs over the bus structure 401, with backup CPU 5 425 held in reserve.

Considering FIG. 4 in more detail, each of the CPUs (421, 422, 423, 424) use a parallel computing program PGP (respectively 431, 432, 433, 434) running a kernel loaded from the GPU, with which they are paired (respectively 411, 412, 413, 414), that is running the applications in parallel. The four CPUs (421, 422, 423, 424) function as a distributed processing cluster as four working nodes (respectively labelled Node A 451, Node B 452, Node C 453, Node D 454) that form a communicator group and establish the lockstep mechanism. Within the message-passing mechanism, Node D 454 acts as MPI master with MPI identification mpi_id=0 and each Node A 451, Node B 452, and Node C 453 acting as the lockstep MPI workers with respective MIP identifications mpi_id=1, mpi_id=2, and mpi_id=3.

The individual output results from the kernels running in parallel on Node A 451, Node B 452, and Node C 453 are then passed by way of the message-passing interface to a lockstep controller 441, having a worker within the MPI mechanism is identified as mpi_id=4. The lockstep controller 441 compares all inputs and output data of the computing results from Nodes A, B, and C, using message-passing interface under the administration of MPI Master CPU-GPU pair 424/414. The lockstep controller 441 determines the output to the system by comparing the output from Nodes A, B, and C using a majority voting process. The lockstep controller 441 also collects evidence of whether an incorrect functionality has occurred during the operation: if one of the Nodes A, B, and C provides results that disagree with the other two nodes, it can be determined to be defective.

As discussed above with respect to FIG. 3, by using three or more CPUs running parallel in a lockstep manner, the outputs of the CPUs can be compared and, by way of a majority vote, the system output can be determined. If one of the CPUs has one or few disagreeing results, this may not necessarily be defective; however, if one of the lockstep CPUs outputs above a number of non-agreeing outputs, or outputs multiple non-agreeing outputs within a relative short period, this can indicate that the CPU-GPU pair is defective.

For example, if the outputs from Node A 451 and Node C 453 agree, but the output of Node B 452 output disagrees with that of Nodes A 451 and C 453, the lockstep controller 441 provides the Node A/C output as the system output, which is then used by the larger system 443 (e.g., vehicle control system) within which the CPU-GPU lockstep system 400 is employed. The lockstep controller 441 will also note that Node B 452 has generated a non-matching vote that is considered as an error and, in some embodiments, generate an alarm to an upper level in the larger system 443. The determination of whether Node B 452 is declared defective can be performed at the level of the lockstep controller 441, at an upper level in the system 443, or a combination of these. Depending on the embodiment, this determination can be based on a single error vote, a number of such errors exceeding a threshold value, a number of errors exceeding a threshold value with a specified time period, or the error rate of the number of errors per total outputs exceeding a threshold value. Once the Node B 452 is considered failed, the corresponding CPU-GPU pair of CPU 2 422 and GPU 2 412 will be removed from the cluster.

Figure 5:
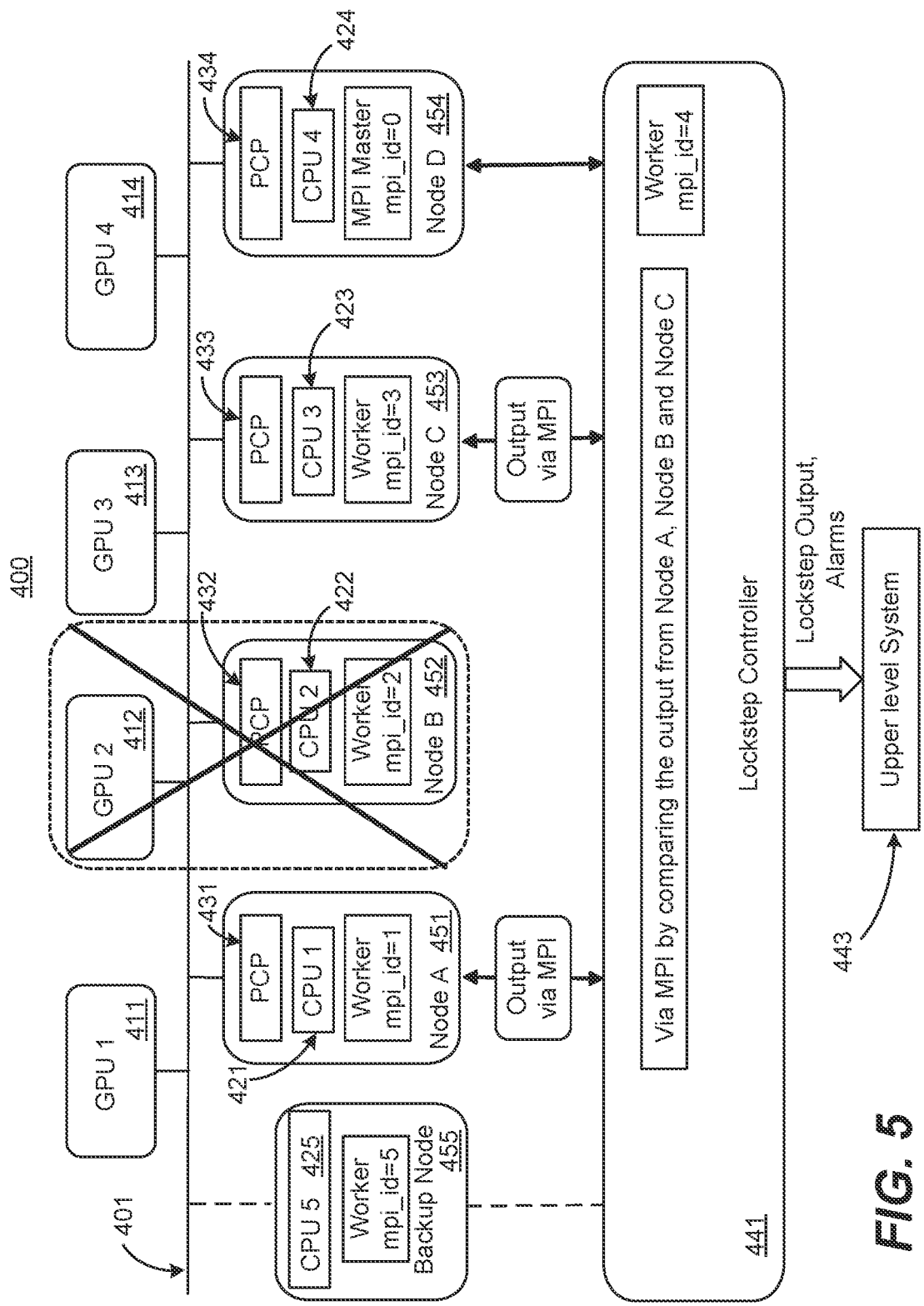
FIG. 5 illustrates the CPU-GPU lockstep system of FIG. 4 with the defective CPU-GPU pair removed from cluster.

FIG. 5 illustrates the CPU-GPU lockstep system of FIG. 4 with the defective CPU-GPU pair removed from the cluster, where Node B 452 is taken as the defective node in this example. When determining whether Node B 452 is defective, the defect could arise from either or both of GPU 2 412 or CPU 2 422, so that the CPU-GPU pair is removed. As Node D 454 is for control of the lockstep system and does not participate in the voting, this leaves only Node A 451 and Node C 453 providing outputs so that there is no majority vote in case of disagreement. As there is no vote, the level of automation of the higher level system 443 would need to be downgraded due to a loss of reliability. As part of a troubleshooting operation, the lockstep system 400 removes the defective node and replaces it with the Backup Node 455 using CPU 5 425.

Figure 6:
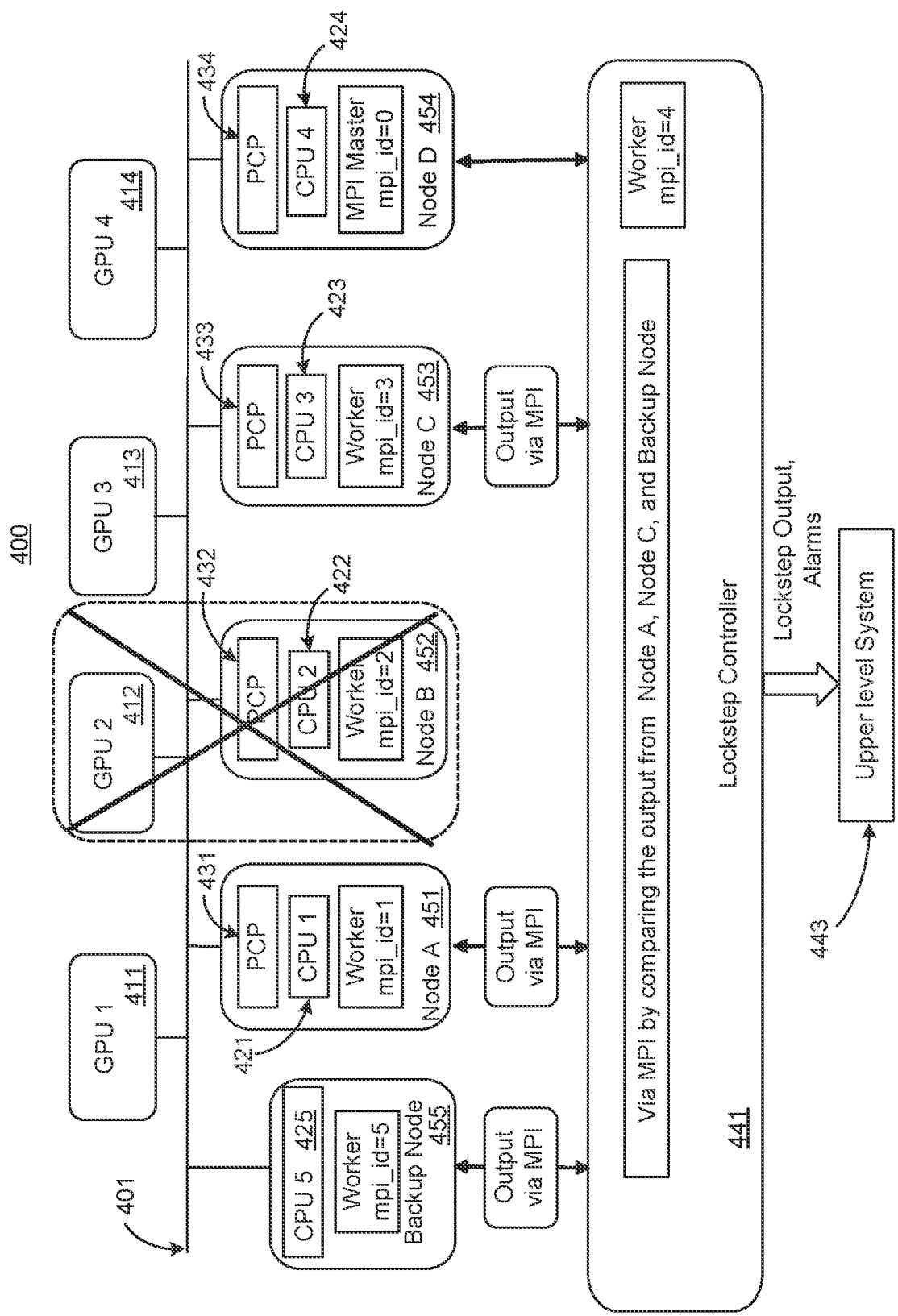
FIG. 6 illustrates the CPU-GPU lockstep system of FIG. 4 with the defective CPU-GPU pair removed from cluster and the backup CPU activated.

FIG. 6 illustrates the CPU-GPU lockstep system of FIG. 4 with the defective CPU-GPU pair removed from cluster and the backup CPU 5 425 activated. As before, the example uses Node B 452 as being defective and the corresponding CPU-GPU pair of CPU 2 422 and GPU 2 412 has been removed. CPU 5 425 is activated and placed in active communication with the bus structure 401 and now provides its output via the message-passing interface to the lockstep controller 441, which uses the message-passing interface functionalities to compare the output from Node A 451, Node C 453, and the Backup Node 455 for the majority voting.

In the embodiment of FIG. 4, three CPU-GPU pairs act as the nodes to provide the outputs used by the lockstep controller 441 in the majority voting process. By removing one of CPU-GPU pairs (CPU 2 422, GPU 2 412 in the example), this leaves only the two Node A 451 and Node C 453 CPU-GPU pairs, as the Node D 454 pair (CPU 4 424, GPU 4 414) are for control and do not participate in the voting. Backup CPU 5 425 provides a CPU for the third voting node, but there are still only two available GPUs, GPU 1 411 and GPU 3 413 for the voting nodes. To provide the additional CPU-GPU pair without the introduction of a backup GPU, one of the GPUs is shared, being paired with backup CPU 5 425 to form a back CPU-GPU pair for the Backup Node 455 while still forming a pair with the CPU with which it was already paired.

Figure 7:
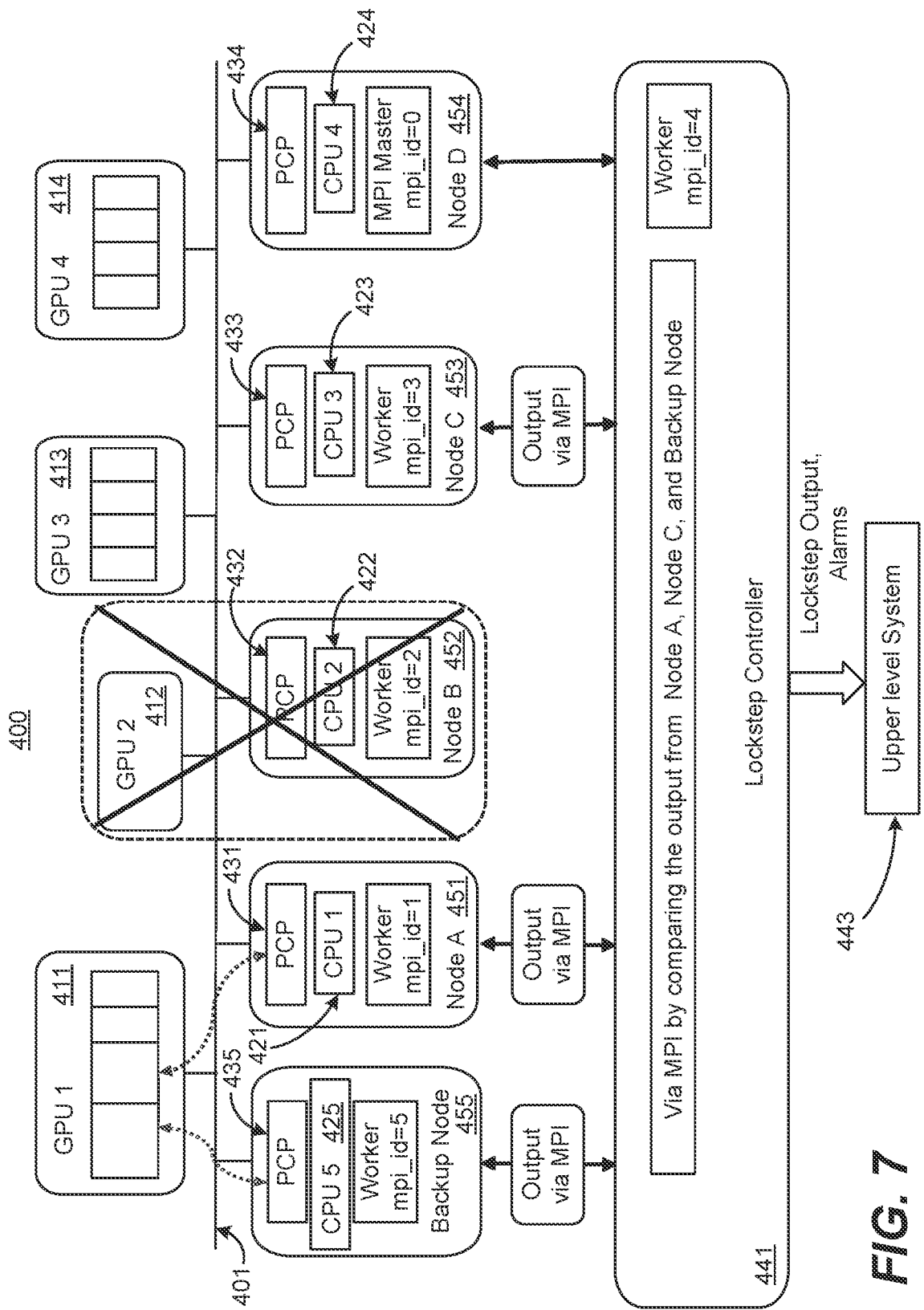
FIG. 7 illustrates an example of a GPU being shared by two CPUs to form two CPU-GPU pairs.

FIG. 7 illustrates an example of a GPU being shared by two CPUs to form two CPU-GPU pairs. In this example, GPU 1 411 is now shared with CPU 1 421 and CPU 5 425 to form the CPU-GPU pairs of (CPU 1 421, GPU 1 411) and (CPU 5 425, GPU 1 411). In the micro-architecture used here, one portion of the address space of GPU 1 411 is assigned to the Node A 451 CPU-GPU pair of (CPU 1 421, GPU 1 411) for CPU 1 421 to run kernels on the parallel computing platform 431 for programs executed on GPU 1 411 using this first portion of the address space. Another portion of the address space of GPU 1 411 is assigned to the Backup Node 455 CPU-GPU pair of (CPU 5 425, GPU 1 411) for the backup CPU 5 425 to run kernels on the parallel computing platform 435 for programs executed on GPU 1 411 using this second portion of the address space. This restores three nodes corresponding to (CPU 1 421, GPU 1 411), (CPU 2 422, GPU 1 412), and (CPU 5 425, GPU 1 411) to provide outputs to the lockstep controller 441 to use to determine the lockstep system output by majority voting.

Figure 8:
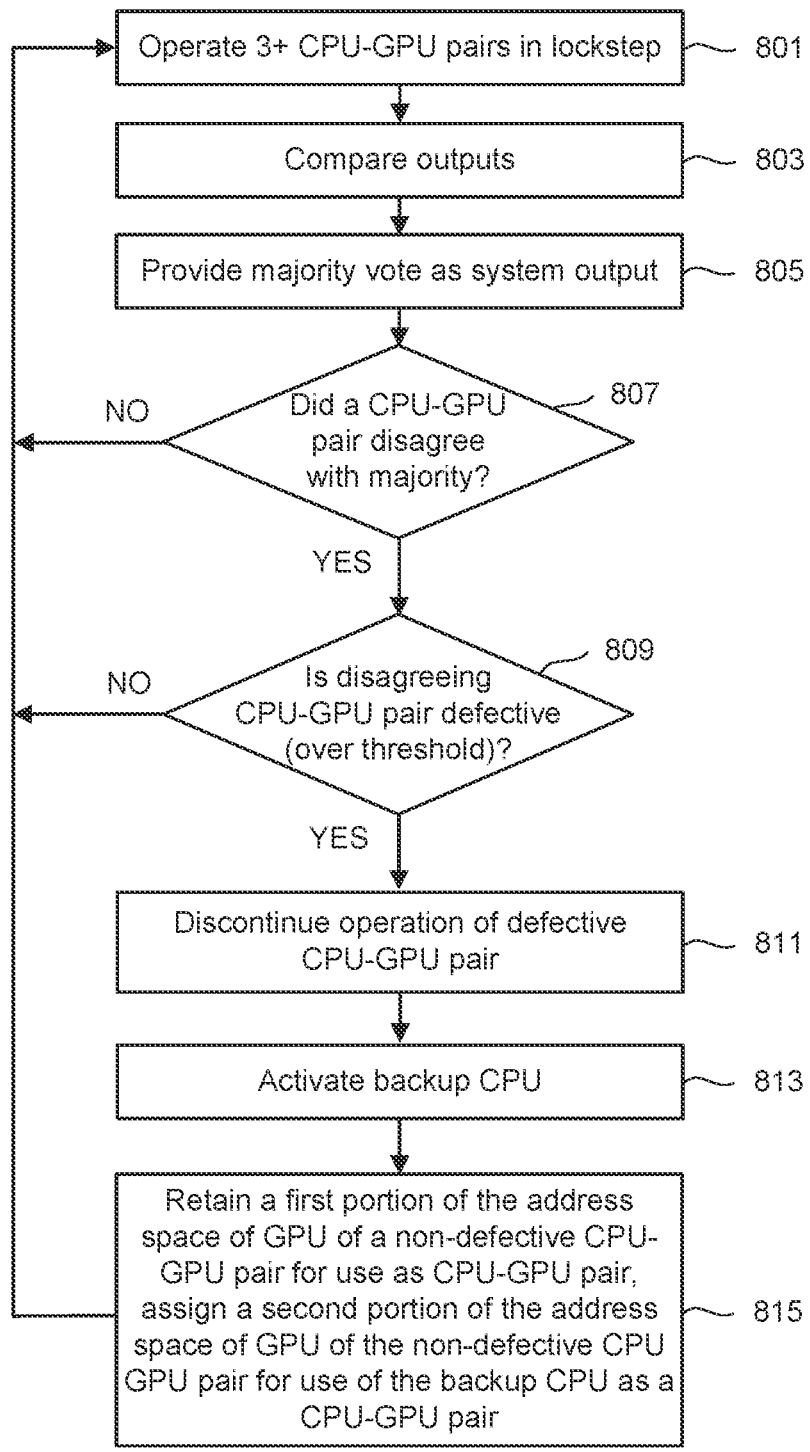
FIG. 8 is a flowchart of an embodiment for operating the system of FIG. 4 as described in FIGS. 4-7.

FIG. 8 is a flowchart of an embodiment for operating the system of FIG. 4 as described in FIGS. 4-7. The process begins at 801 with three or more CPU-GPU pairs being operated in parallel in a lockstep manner. In the lockstep system of FIG. 4, the CPU-GPU pairs (CPU 1 421, GPU 1 411), (CPU 2 422, GPU 2 412), and (CPU 3 423, GPU 3 413) respectively act as Nodes A 451, B 452, and C 453 of a cluster under the administration of the message-passing interface master of CPU-GPU pair (CPU 4 424, GPU 4 414). At 803 the outputs from Nodes A 451, B 452, and C 453 are compared by the lockstep controller 441, with the result of a majority vote provided as the lockstep system at 805.

If the output from the CPU-GPU pair of one of the nodes differs from the other two, this is determined at 807 by the lockstep controller 441. If there was no disagreement, the flow loops back to 801 and lockstep system 400 continues to operate the three or more CPU-GPU pairs in lockstep. If there a CPU-GPU pair does disagree, step 809 determines whether the disagreeing CPU-GPU pair should be declared defective. This process can be performed at the level of the lockstep system by lockstep controller 441 and/or the administrative CPU-GPU pair (CPU 4 424, GPU 4 414), at a higher system level based alarms sent by the lockstep controller 441, or a combination of these. Depending on the embodiment, the criteria for finding a GPU-GPU pair defective can be one or more of the number of differing (i.e., non-majority) outputs from the pair is over a threshold value for the total number of outputs in error, a threshold value for the total number of outputs in errors with a time interval, or a threshold for the proportion of outputs that are in error. If the CPU-GPU pair is not found defective, the flow again loops back to 801.

If a CPU-GPU pair is found defective at 809, the operation of the defective CPU-GPU pair is discontinued at 811. As the determination at 809 is dependent on the outputs from the node, and the nodes output is based on both the GPU executing the programs and the corresponding CPU running kernels on the parallel computing platform on the CPU, the error leading to the non-agreeing outputs could originate on either of the CPU or the GPU of the pair, so that the operation of the pair. In the example of FIG. 5, it is the Node B 452 pair of CPU 2 422 and GPU 2 412 that are found defective and switched out.

The backup CPU is activated at 813 to replace the switched out CPU. In the example of FIG. 6 for the lockstep system of FIG. 4, backup CPU 5 415 is activated to serve as the Backup Node 455 to replace Node B 452 and CPU 2 422. To be able to form a CPU-GPU pair for the Backup Node 455, at 815 the GPU of one of the non-defective CPU-GPU pairs is paired with both its current CPU partner and also with the backup CPU. For the current CPU partner of the GPU to be shared, a portion of the address space of the GPU is retained for use of this CPU-GPU pair. Another portion of this GPU's address space is assigned to the back CPU in order to form the backup CPU-GPU pair. In the example of FIG. 7, it is a portion of the address space of GPU 1 411 that is assigned for use with the backup CPU 5 425 to form the CPU-GPU pair for the Backup Node 455, while another portion of the address space of GPU 1 411 is retained for use in the Node A 451 pair of (CPU 1 421, GPU 1 411).

For the sharing of a GPU with multiple CPUs to form multiple CPU-GPU pairs, embodiments of a Multi-Process Service (MPS) binary-compatible implementation of a parallel computing platform, such as CUDA, Application Programming Interface (API) can be used. The MPS runtime architecture can be designed to transparently enable co-operative multi-process parallel computing platform (PCP) applications, typically MPI jobs, to allow PCP kernels from the CPUs of different CPU-GPU pairs to be processed concurrently on the same GPU. This can benefit performance when the GPU compute capacity is underutilized by a single application process. The MPS CPU clients submit work directly to the GPU without passing through the MPS server, with each MPS CPU client owns its own GPU address space, instead of sharing GPU address space with other MPS clients.

Figure 9:
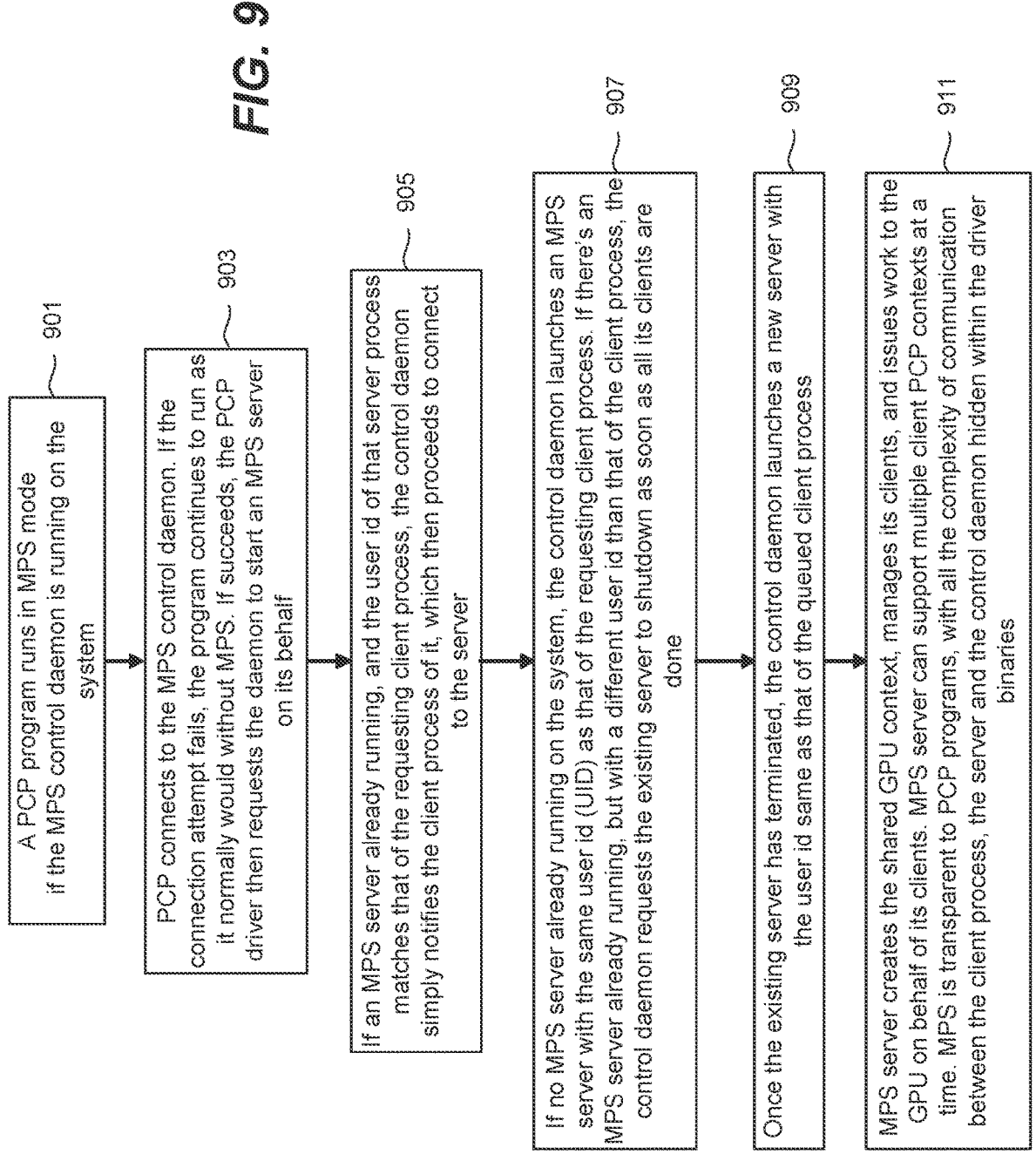
FIG. 9 is a workflow for one embodiment for defining, initializing, and ending of a Multi-Process Service process.

FIG. 9 is a workflow for one embodiment for defining, initializing, and ending of a MPS process that can be performed under the administration of an MPI Master CPU-GPU pair 424/414. At 901, a PCP program, such as 431, 432, 433, 434, and 435, runs in MPS mode if the MPS control daemon is running on the system 400. The PCP connects to the MPS control daemon at 903. If the connection attempt fails, the program continues to run as it normally would without MPS. If this succeeds, the PCP driver then requests the daemon to start an MPS server on its behalf. If there is an MPS server already running, and the user ID of that server process matches that of the requesting client process, at 905 the control daemon simply notifies the client process of it, which then proceeds to connect to the server.

At 907, if there is no MPS server already running on the system, the control daemon launches an MPS server with the same user ID (UID) as that of the requesting client process. If there is an MPS server already running, but with a different user ID than that of the client process, the control daemon requests the existing server to shut down as soon as all its clients are done. Once the existing server has terminated, the control daemon launches a new server with the user ID the same as that of the queued client process at 909.

At 911 the MPS server creates the shared GPU context, manages its clients, and issues work to the GPU on behalf of its clients. An MPS server can support multiple (e.g., up to 16) client PCP contexts at a time. The MPS can be transparent to PCP programs, with all the complexity of communication between the client process, the server and the control daemon hidden within the driver binaries.

In terms of splitting resources on a GPU, the MPS embodiments here allow the CPU clients sharing a GPU to form CPU-GPU pairs to submit work directly to the GPU without passing through the MPS server. Each MPS client CPU owns its own GPU address space instead of sharing GPU address space with other MPS clients. This allows the client PCP contexts to bypass the hardware limitations associated with time sliced scheduling, and permits their kernels to execute simultaneously. A client CPU PCP context manages most of the hardware resources on the MPS and can submit work to the hardware directly, with the MPS server mediating the remaining shared resources required to ensure simultaneous schedule.

Figure 10:
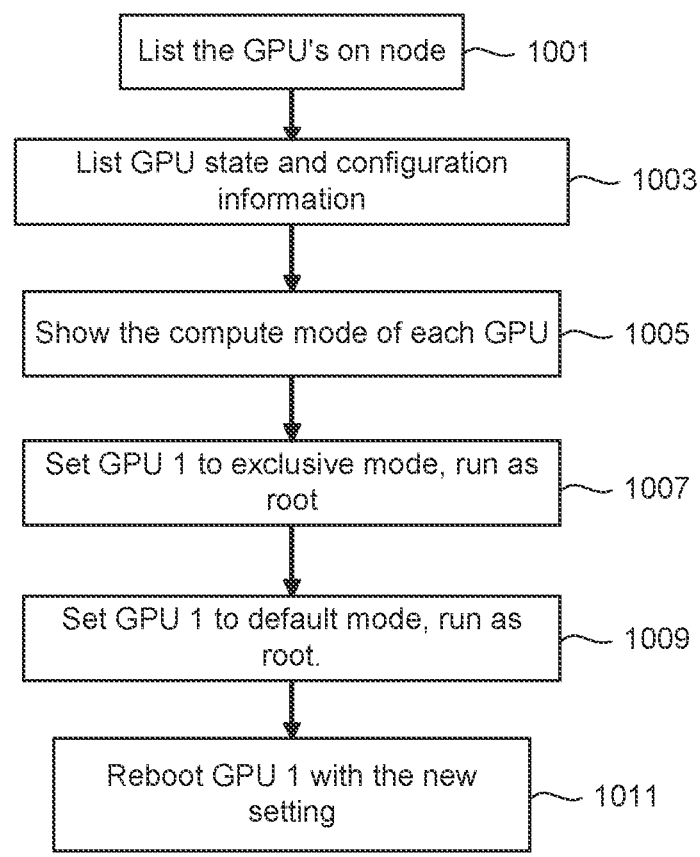
FIG. 10 is a flow for an embodiment to configure GPUs on a node using the MPS control and management interface.

FIG. 10 is a flow for an embodiment of an utility to configure GPUs on a node using the MPS control and management interface, which can be under the administration of MPI Master CPU-GPU pair 424/414. At 1001, the utility lists the GPUs on a node, with the state and configuration information on these CPUs listed at 1003. The compute mode for each GPU is shown at 1005. At 1007 GPU 1 411 (in the example of FIGS. 4-7 where GPU 1 411 forms CPU-GPU pairs with both CPU 1 421 and CPU 5 425) is set to exclusive mode and ran as root, and at 1009 the GPU 1 411 is set to default mode and ran as root. GPU 1 411 is rebooted with the new setting at 1011.

FIGS. 11 and 12 are embodiments for flows for the user's control in a multi-user system and a single-user system, respectively. For example, a multi-user system would correspond to the situation in FIG. 7, where both of CPU 1 421 and CPU 5 425 are paired with GPU 1 411, and a single-user system would correspond to CPU 3 423 that is paired with GPU 3 413. The discussion of these two flows will refer to these examples from FIG. 7.

For the multi-user case, to cause all users (CPU 1 421, CPU 5 425 in this example) of the system to run PCP applications (431, 435) via MPS, 1101 sets up the MPS control daemon to run when the system starts. The MPS control daemon starts at 1103, setting the GPU (GPU 1 411) to exclusive mode. Starting the MPS control daemon that will spawn a new MPS Server instance for any device ID ($UID, or mpi_id=1 and mpi_id=5) starting an application and associating it with the GPU visible to the control daemon. At 1105, the MPS control daemon shuts down, as root, and runs echo quit. The files are logged at 1107, where the status of the daemons can be viewed by viewing the log files in.

The single-user case begins at 1201 with the control daemon being launched with the same user ID as that of the client process (mpi_id=3 for CPU 3 423). The MPS control daemon is started at 1203 to spawn a new MPS server instance for the user ID ($UID) that is starting an application and associates it with the GPU visible to the control daemon (GPU 3 413). At 1205 the MPS client application (433) starts, with the appropriate variables in the client process's environment, setting the same location as the MPS control daemon. PCP visible devices should not be set in the client's environment. 1207 shuts down MPS by shutting down the daemon, as $UID, and running echo quit. The files are logged at 1209, where the status of the daemons can be viewed by viewing the log files in.

Figure 13:
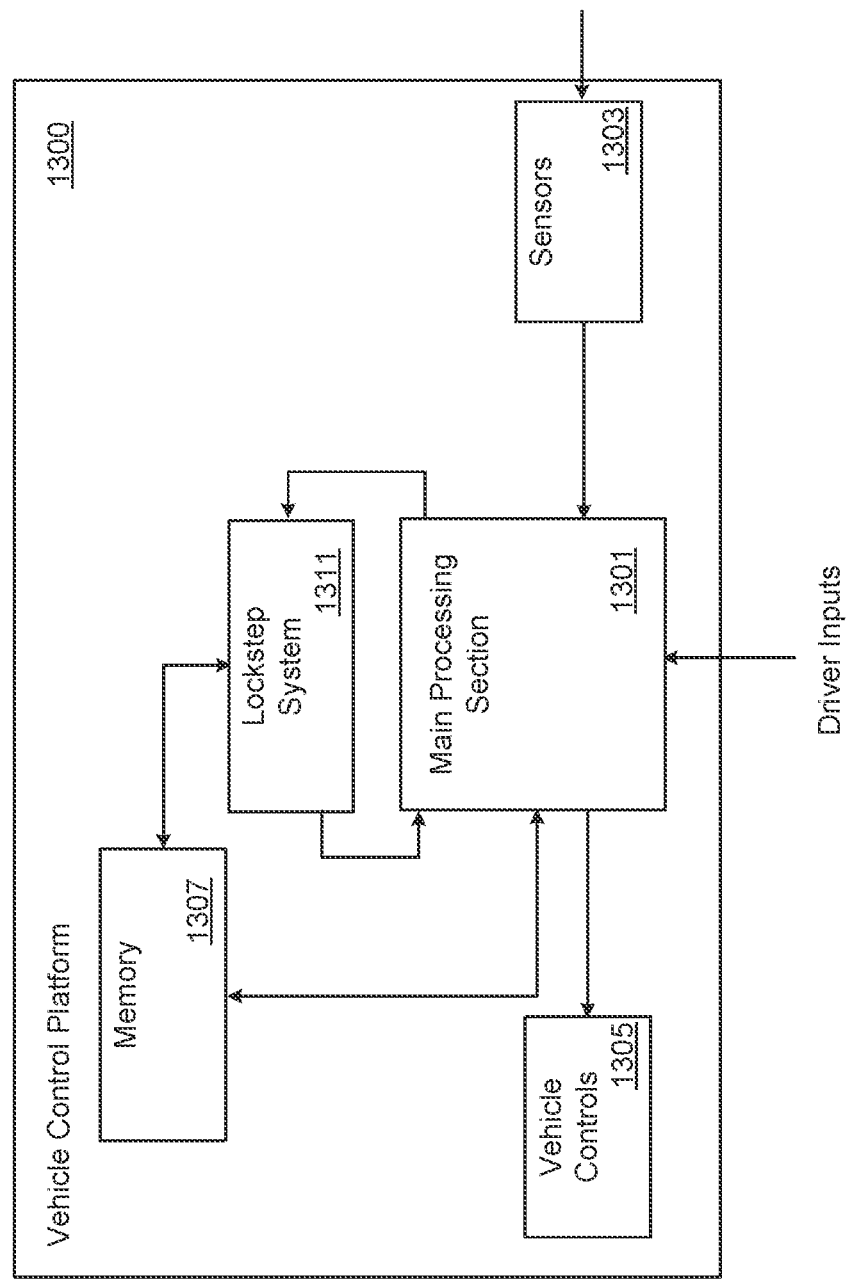
FIG. 13 is a block diagram of a system within which the CPU-GPU lockstep system can be incorporated.

FIG. 13 is a block diagram of a system within which the CPU-GPU lockstep system can be incorporated, specifically the example of a vehicle control platform 1300. Such systems are used in autonomous vehicles and to assist drivers of driver controlled vehicles by way of a system used to assist in controlling features such as braking, traction control, and other driver aids. In such control platforms a computer failure could be catastrophic.

The vehicle control platform 1300 includes a main processing section 1301 that controls the platform. This can be one or several processors managing the platform. To be able to sense the vehicle's environment the vehicle control platform 1300 includes sensors 1303 capable to sense the vehicle's environment. Examples of such sensors 1303 include radar, lidar, sonar, GPS, odometry and inertial measurement units. The main processing section 1301 can interpret the sensory information and provide control signals to the vehicle control systems 1305, which can include elements such as the brakes, steering, and throttle for the vehicle. Depending on the degree of autonomy, the main processing unit 1301 may also receive driver inputs. The control platform 1300 also includes memory 1307 for use of the main processing section 1301.

The vehicle control platform 1300 also includes a lockstep system 1311 that can be as in the embodiments described above for CPU-GPU lockstep systems with respect to FIGS. 4-12. As represented in FIG. 13, the lockstep system 1311 is connected to the memory 1307 and the main processing section 1301. Although represented as separate elements in FIG. 13, depending on the embodiment the lockstep system 1311 can be considered as part of the main processing section 1301 depending on how the elements are defined and implemented. The lockstep system 1311 receives its inputs, whether from the sensors 1303 or user input, either directly or by way of the main processing section 1301. Similarly, the lockstep system 1311 may have its outputs provided directly to the vehicle controls 1305 directly or via the main processing section 1301.

Figure 14:
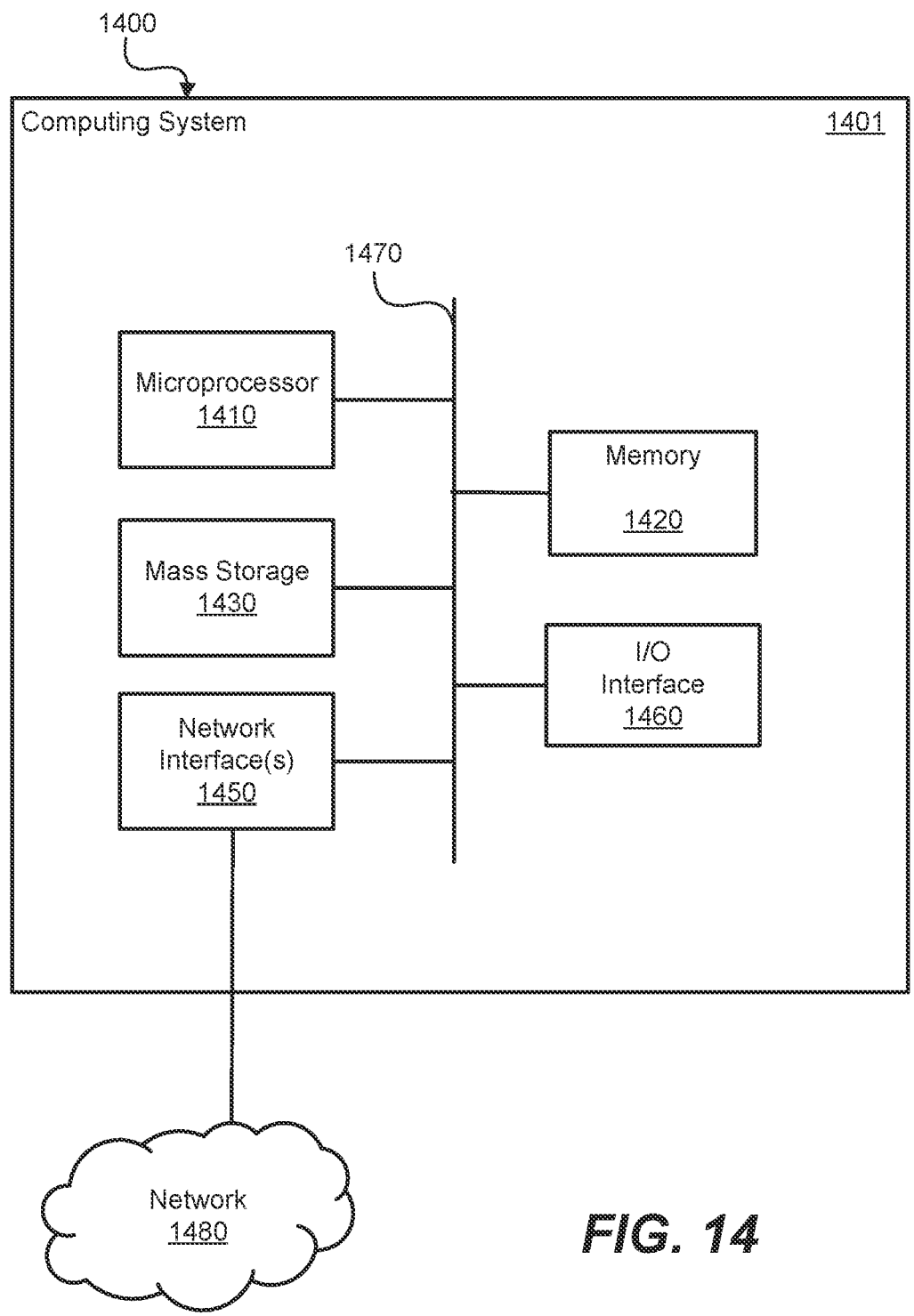
FIG. 14 is a high-level block diagram of a more general computing system that can be used to implement various embodiments described in the preceding figures.

FIG. 14 is a high-level block diagram of a more general computing system 1400 that can be used to implement various embodiments of the processing systems described above. In one example, computing system 1400 is a network system 1400. Specific devices may utilize all of the components shown, or only a subset of the components, and levels of integration may vary from device to device. Furthermore, a device may contain multiple instances of a component, such as multiple processing units, processors, memories, transmitters, receivers, etc.

The network system may comprise a computing system 1401 equipped with one or more input/output devices, such as network interfaces, storage interfaces, and the like. The computing system 1401 may include a central processing unit (CPU) 1410, a memory 1420, a mass storage device 1430, and an I/O interface 1460 connected to a bus 1470, where the microprocessor can be such as described above with respect to FIG. 1B or the lockstep computing systems as described above. The computing system 1401 is configured to connect to various input and output devices (keyboards, displays, etc.) through the I/O interface 1460. The bus 1470 may be one or more of any type of several bus architectures including a memory bus or memory controller, a peripheral bus or the like.

The CPU 1410 may comprise any type of electronic data processor, including the microprocessor 120 of FIG. 1B. The CPU 1410 may be configured to implement any of the schemes described herein with respect to the lockstep system operations of FIGS. 2-12, using any one or combination of elements described in the embodiments. The memory 1420 may comprise any type of system memory such as static random access memory (SRAM), dynamic random access memory (DRAM), synchronous DRAM (SDRAM), read-only memory (ROM), a combination thereof, or the like. In an embodiment, the memory 1420 may include ROM for use at boot-up, and DRAM for program and data storage for use while executing programs.

The mass storage device 1430 may comprise any type of storage device configured to store data, programs, and other information and to make the data, programs, and other information accessible via the bus 1470. The mass storage device 1430 may comprise, for example, one or more of a solid-state drive, hard disk drive, a magnetic disk drive, an optical disk drive, or the like.

The computing system 1401 also includes one or more network interfaces 1450, which may comprise wired links, such as an Ethernet cable or the like, and/or wireless links to access nodes or one or more networks 1480. The network interface 1450 allows the computing system 1401 to communicate with remote units via the network 1480. For example, the network interface 1450 may provide wireless communication via one or more transmitters/transmit antennas and one or more receivers/receive antennas. In an embodiment, the computing system 1401 is coupled to a local-area network or a wide-area network for data processing and communications with remote devices, such as other processing units, the Internet, remote storage facilities, or the like. In one embodiment, the network interface 1450 may be used to receive and/or transmit interest packets and/or data packets in an ICN. Herein, the term "network interface" will be understood to include a port.

The components depicted in the computing system of FIG. 14 are those typically found in computing systems suitable for use with the technology described herein, and are intended to represent a broad category of such computer components that are well known in the art. Many different bus configurations, network platforms, and operating systems can be used.

The technology described herein can be implemented using hardware, firmware, software, or a combination of these. Depending on the embodiment, these elements of the embodiments described above can include hardware only or a combination of hardware and software (including firmware). For example, logic elements programmed by firmware to perform the functions described herein is one example of elements of the described lockstep systems. A CPUs and GPUs can include a processor, FGA, ASIC, integrated circuit or other type of circuit. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. For example, some of the elements used to execute the instructions issued in FIG. 2, such as an arithmetic and logic unit (ALU), can use specific hardware elements. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A processing system, comprising:
   three or more central processing unit (CPU)-graphical processing unit (GPU) pairs, the CPU of each of the CPU-GPU pairs configured to run kernels for programs executing on a corresponding GPU of the CPU-GPU pair;
   a backup CPU; and
   a lockstep controller connected to the three or more CPU-GPU pairs and to the backup CPU, the lockstep controller configured to:
      operate the three or more CPU-GPU pairs in parallel to execute programs in a lockstep manner, the CPU of each CPU-GPU pairs running kernels for the programs in parallel;
      compare an output from each CPU of the three or more CPU-GPU pairs for each of one or more kernels running on the CPUs of the three or more CPU-GPU pairs;
      based upon comparing the outputs, determine whether any of the CPU-GPU pairs are defective; and
      in response to determining that a first of the CPU-GPU pairs is defective:
         discontinue the operation of the first GPU-CPU pair in parallel to execute programs in a lockstep manner with others of the three or more CPU-GPU pairs; and
         operate the others of the three or more CPU-GPU pairs and the backup CPU and the GPU of a second of the CPU-GPU pairs in parallel to execute programs in a lockstep manner, the CPU of the second CPU-GPU pair operating as a CPU-GPU pair with the GPU of the second CPU-GPU pair and the backup CPU operating as a CPU-GPU pair with the GPU of the second CPU-GPU pair, the backup CPU and the CPUs of the others of the CPU-GPU pairs running kernels for the programs in parallel.

2. The processing system of claim 1, wherein the lockstep controller is further configured to:
   assign a first portion of an address space of the GPU of the second CPU-GPU pair to execute the programs for which the second CPU runs kernels; and
   assign a second portion of the address space of the GPU of the second of the CPU-GPU pairs to execute the programs for which the backup CPU runs kernels, the second CPU operating as a CPU-GPU pair with the first portion of the address space of the GPU of the second CPU-GPU pair and the backup CPU operating as a CPU-GPU pair with the second portion of the address space of the GPU of the second CPU-GPU pair.

3. The processing system of claim 1, wherein the number of three or more CPU-GPU pairs is three.

4. The processing system of claim 1, wherein the CPUs of the three or more CPU-GPU pairs and the backup CPU are configured to provide outputs to the lockstep controller by a message-passing interface.

5. The processing system of claim 4, wherein the CPUs of the three or more CPU-GPU pairs and the backup CPU are configured as worker nodes for the message-passing interface, the system further comprising:
an additional CPU-GPU pair, the CPU of the additional CPU-GPU pair configured as a master node for the message-passing interface.

6. The processing system of claim 1, wherein the lockstep controller is further configured to:
based upon comparing the outputs of kernels running on the CPUs, determine an output for the kernels running based on a majority vote determination.

7. The processing system of claim 1, wherein, in determining that a first of the CPU-GPU pairs is defective, the lockstep controller is further configured to:
determine when the output of the first CPU-GPU pair for one or more kernel differs from the outputs of the others of the CPU-GPU pairs for the kernels.

8. The processing system of claim 7, wherein, in determining that a first of the CPU-GPU pairs is defective, the lockstep controller is further configured to:
maintain a count of a number of times that the output of the first CPU-GPU pair for one or more kernel differs from the outputs of the others of the CPU-GPU pairs for the kernels; and
determine whether the count exceeds a threshold, wherein the first CPU-GPU pair is determined to be defective.

9. The processing system of claim 1, wherein the programs include neural networks.

10. The processing system of claim 1, wherein the programs include vehicle control programs.

11. A method of operating a processing system, comprising:
operating three or more central processing unit (CPU)-graphical processing unit (GPU) pairs of the processing system in parallel to execute programs in a lockstep manner, the CPU of each CPU-GPU pairs running kernels for the programs in parallel;
comparing an output from each CPU of the three or more CPU-GPU pairs for each of one or more kernels running on the CPUs of the three or more CPU-GPU pairs;
based upon comparing the outputs, determining whether any of the CPU-GPU pairs are defective; and
in response to determining that a first of the CPU-GPU pairs is defective:
discontinuing operation of the first GPU-CPU pair in parallel to execute programs in a lockstep manner with others of the three or more CPU-GPU pairs; and
operating the others of the three or more CPU-GPU pairs and the backup CPU and the GPU of a second of the CPU-GPU pairs in parallel to execute programs in a lockstep manner, the CPU of the second CPU-GPU pair operating as a CPU-GPU pair with the GPU of the second CPU-GPU pair and the backup CPU operating as a CPU-GPU pair with the second GPU of the second CPU-GPU pair, the backup CPU and the CPUs of the others of the CPU-GPU pairs running kernels for the programs in parallel.

12. The method of claim 11, further comprising in response to determining that a first of the CPU-GPU pairs is defective:
assigning a first portion of an address space of the GPU of the second CPU-GPU pair to execute the programs for which the second CPU runs kernels;
assigning a second portion of the address space of the GPU of the second CPU-GPU pair to execute the programs for which a backup CPU of the processing system runs kernels; and
operating the others of the three or more CPU-GPU pairs and the backup CPU and second GPU in parallel to execute programs in a lockstep manner by:
operating the second CPU as a CPU-GPU pair with the first portion of the address space of the GPU of the second CPU-GPU pair, and
operating the backup CPU as a CPU-GPU pair with the second portion of the address space of the GPU of the second CPU-GPU pair.

13. The method of claim 11, further comprising:
determining a system output for the kernels by a majority vote determination based upon comparing the outputs of kernels running on the CPUs.

14. The method of claim 11, wherein the comparing is performed by a lockstep controller and the CPUs of the three or more CPU-GPU pairs and the backup CPU are configured to provide outputs to the lockstep controller by a message-passing interface.

15. The method of claim 14, wherein the CPUs of the three or more CPU-GPU pairs and the backup CPU are configured as worker nodes for the message-passing interface, and the method further comprises:
operating a CPU of an additional CPU-GPU pair as a master node for the message-passing interface.

16. A lockstep processing system, comprising:
a lockstep controller configured to be connected to three or more central processing unit (CPU)-graphical processing unit (GPU) pairs, the CPU of each CPU-GPU pair configured to run kernels for programs executing on a corresponding GPU of the CPU-GPU pair, and to a backup CPU, the lockstep controller configured to:
operate the three or more CPU-GPU pairs in parallel to execute programs in a lockstep manner, the CPU of each CPU-GPU pairs running kernels for the programs in parallel;
compare an output from each CPU of the three or more CPU-GPU pairs for each of one or more kernels running on the CPUs of the three or more CPU-GPU pairs;
based upon comparing the outputs, determine whether any of the CPU-GPU pairs are defective; and
in response to determining that a first of the CPU-GPU pairs is defective:
discontinue the operation of the first GPU-CPU pair in parallel to execute programs in a lockstep manner with others of the three or more CPU-GPU pairs; and
operate the others of the three or more CPU-GPU pairs and the backup CPU and the GPU of a second of the CPU-GPU pairs in parallel to execute programs in a lockstep manner, the CPU of the second CPU-GPU pair operating as a CPU-GPU pair with the GPU of the second CPU-GPU pair and the backup CPU operating as a CPU-GPU pair with the GPU of the second CPU-GPU pair, the backup CPU and the CPUs of the others of the CPU-GPU pairs running kernels for the programs in parallel.

17. The lockstep processing system of claim 16, wherein the lockstep controller is further configured to:
   assign a first portion of an address space of the GPU of the second CPU-GPU pair to execute the programs for which the second CPU runs kernels; and
   assign a second portion of the address space of the GPU of the second of the CPU-GPU pairs to execute the programs for which the backup CPU runs kernels, the second CPU operating as a CPU-GPU pair with the first portion of the address space of the GPU of the second CPU-GPU pair and the backup CPU operating as a CPU-GPU pair with the second portion of the address space of the GPU of the second CPU-GPU pair.

18. The lockstep processing system of claim 16, wherein the lockstep controller is further configured to:
   based upon comparing the outputs of kernels running on the CPUs, determine an output for the kernels running based on a majority vote determination.

19. The lockstep processing system of claim 16, wherein, in determining that a first of the CPU-GPU pairs is defective, the lockstep controller is further configured to:
   determine when the output of the first CPU-GPU pair for one or more kernel differs from the outputs of the others of the CPU-GPU pairs for the kernels.

20. The lockstep processing system of claim 19, wherein, in determining that a first of the CPU-GPU pairs is defective, the lockstep controller is further configured to:
   maintain a count of a number of times that the output of the first CPU-GPU pair for one or more kernel differs from the outputs of the others of the CPU-GPU pairs for the kernels; and
   determine whether the count exceeds a threshold, wherein the first CPU-GPU pair is determined to be defective.

* * * * *